(12) United States Patent
Gammel et al.

(10) Patent No.: US 11,374,866 B2
(45) Date of Patent: Jun. 28, 2022

(54) EVENT-BASED FLOW CONTROL IN SOFTWARE-DEFINED NETWORKS

(71) Applicant: Schweitzer Engineering Laboratories, Inc., Pullman, WA (US)

(72) Inventors: Dennis Gammel, Pullman, WA (US); Rhett Smith, Odessa, FL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 93 days.

(21) Appl. No.: 17/022,738

(22) Filed: Sep. 16, 2020

(65) Prior Publication Data

US 2020/0412652 A1    Dec. 31, 2020

Related U.S. Application Data

(63) Continuation of application No. 16/042,410, filed on Jul. 23, 2018, now Pat. No. 10,812,392, which is a
(Continued)

(51) Int. Cl.
*H04L 47/125* (2022.01)
*H04L 47/25* (2022.01)
(Continued)

(52) U.S. Cl.
CPC ............ *H04L 47/125* (2013.01); *H04L 41/06* (2013.01); *H04L 41/0816* (2013.01);
(Continued)

(58) Field of Classification Search
CPC ..... H04L 41/06; H04L 41/0816; H04L 45/20; H04L 45/38; H04L 47/125; H04L 47/25;
(Continued)

(56) References Cited

U.S. PATENT DOCUMENTS 8,811,197 B2 *   8/2014   Chen ................... H04L 45/00
                                              370/252
9,397,917 B2 *   7/2016   Li ....................... H04L 43/0876
(Continued)

FOREIGN PATENT DOCUMENTS

CA     3036226 A1 *   4/2018   ............. G06F 13/00
CA     2911269 C  *   3/2020   ............. H04L 45/24
(Continued)

*Primary Examiner* — Eric Nowlin
(74) *Attorney, Agent, or Firm* — Justin K. Flanagan

(57) ABSTRACT

A software-defined network controller (SDN controller) defines a first network flow to be selectively implemented by a networking device according to a first network operation profile. The SDN controller defines a second network flow to be selectively implemented by the networking device according to a second network operation profile. A memory device of the networking device may store at least first and second network operation profiles for selective implementation during defined event windows. The event window(s) may be defined by start event inputs and stop event inputs. The event inputs may include, without limitation, a combination of parameter-based inputs and/or temporal inputs. In one specific embodiment, the networking device detects a network event and modifies a network operation profile for a preset time period and/or until an interrupt or stop event is detected.

20 Claims, 13 Drawing Sheets

Related U.S. Application Data continuation-in-part of application No. 15/911,344, filed on Mar. 5, 2018, now Pat. No. 10,560,390.

(51) Int. Cl.
| | |
|---|---|
| *H04L 41/0816* | (2022.01) |
| *H04L 41/06* | (2022.01) |
| *H04L 69/28* | (2022.01) |
| *H04L 45/00* | (2022.01) |
| *H04L 47/32* | (2022.01) |
| *H04L 67/30* | (2022.01) |

(52) U.S. Cl.
CPC .............. *H04L 45/20* (2013.01); *H04L 45/38* (2013.01); *H04L 47/25* (2013.01); *H04L 47/32* (2013.01); *H04L 67/30* (2013.01); *H04L 69/28* (2013.01)

(58) Field of Classification Search
CPC ......... H04L 47/32; H04L 67/30; H04L 69/28; Y04S 40/00
See application file for complete search history.

(56) References Cited

U.S. PATENT DOCUMENTS

| | | | | |
|---|---|---|---|---|
| 9,929,966 | B2* | 3/2018 | Nakakes | H04L 47/286 |
| 2011/0299406 | A1* | 12/2011 | Vobbilisetty | H04L 43/10 |
| | | | | 370/248 |
| 2013/0058235 | A1* | 3/2013 | Johnsson | H04L 43/0876 |
| | | | | 370/252 |
| 2014/0211794 | A1* | 7/2014 | Frost | H04L 47/286 |
| | | | | 370/389 |
| 2015/0271084 | A1* | 9/2015 | Nakakes | H04L 45/26 |
| | | | | 370/392 |
| 2016/0035049 | A1* | 2/2016 | Ramesh | H04W 12/125 |
| | | | | 705/412 |
| 2016/0087887 | A1* | 3/2016 | Fung | H04L 49/3009 |
| | | | | 370/401 |
| 2016/0337314 | A1* | 11/2016 | Yu | H04L 41/28 |
| 2017/0048154 | A1* | 2/2017 | Fung | H04L 49/25 |
| 2018/0048666 | A1* | 2/2018 | Alderson | H04L 63/10 |
| 2018/0167337 | A1* | 6/2018 | Keaveny | H04L 43/16 |
| 2018/0241621 | A1* | 8/2018 | Vaishnavi | H04L 41/083 |
| 2018/0375777 | A1* | 12/2018 | Ewert | H04L 45/308 |
| 2020/0021536 | A1* | 1/2020 | Kanza | H04L 43/0852 |
| 2020/0028770 | A1* | 1/2020 | Li | H04L 45/00 |
| 2020/0287824 | A1* | 9/2020 | Dutta | H04L 45/20 |
| 2020/0296125 | A1* | 9/2020 | Alderson | H04L 63/0227 |
| 2021/0234806 | A1* | 7/2021 | C H | H04L 47/11 |

FOREIGN PATENT DOCUMENTS

| | | | | |
|---|---|---|---|---|
| CN | 101951654 B | * | 3/2013 | |
| CN | 107241268 A | * | 10/2017 | ......... H04B 7/18506 |
| CN | 107241268 B | * | 5/2020 | ......... H04B 7/18506 |
| JP | 2005039724 A | * | 2/2005 | |
| JP | 4304018 B2 | * | 7/2009 | |

* cited by examiner

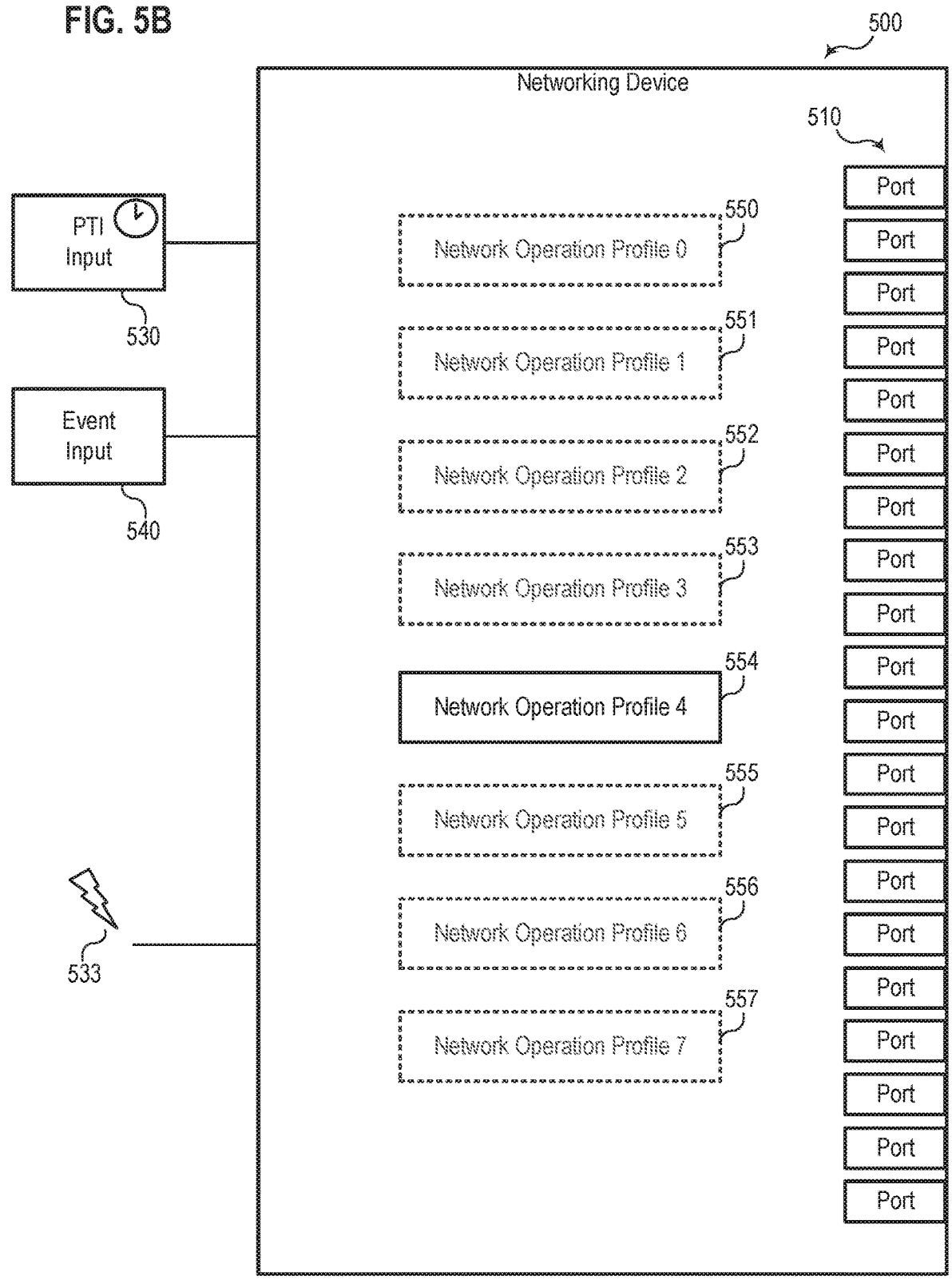

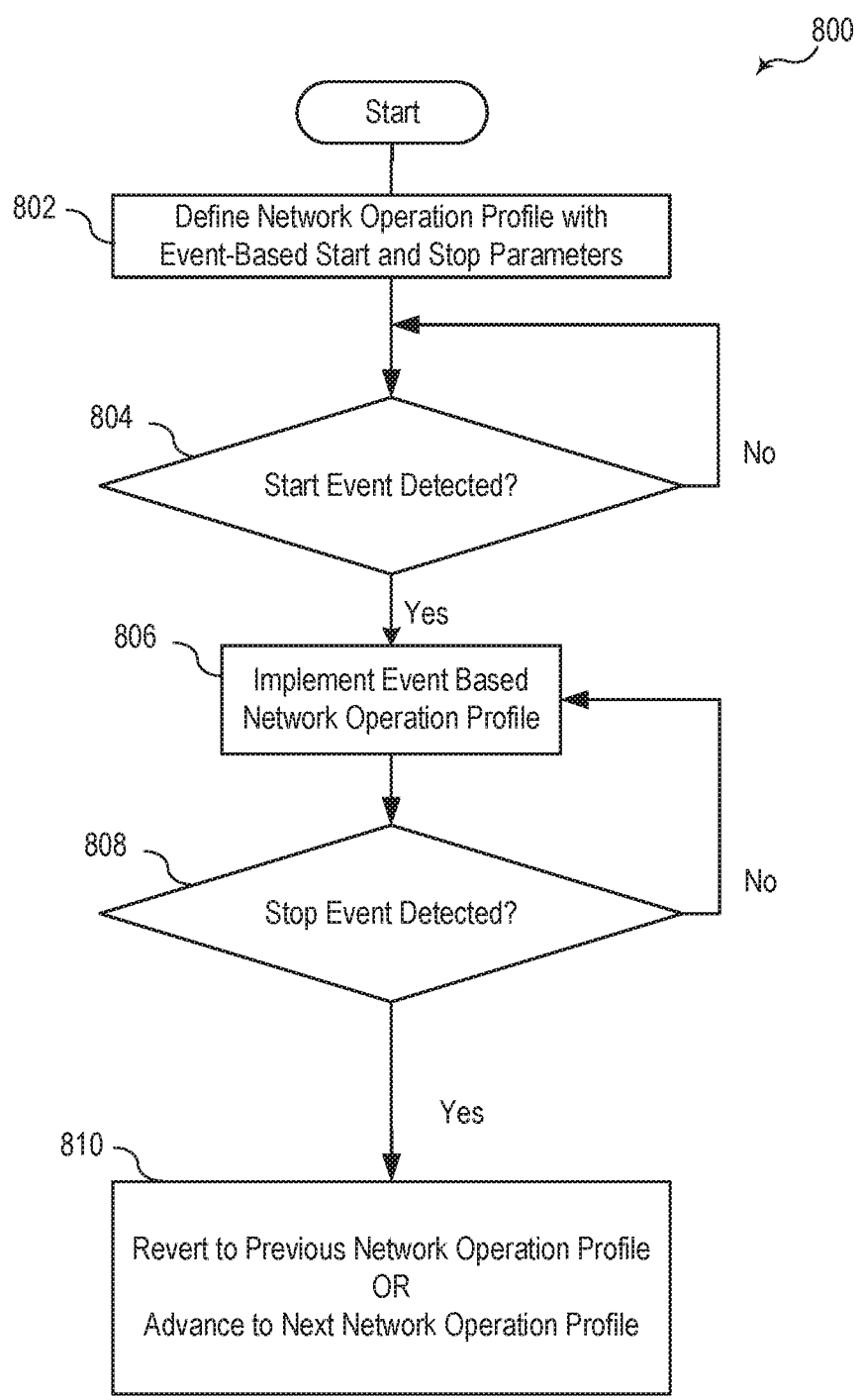

EVENT-BASED FLOW CONTROL IN SOFTWARE-DEFINED NETWORKS

PRIORITY APPLICATIONS

This application claims priority as a continuation application to U.S. patent application Ser. No. 16/042,410 filed on 23 Jul. 2018 titled "Event-Based Flow Control in Software Defined Networks" which claims priority as a continuation-in-part of U.S. patent application Ser. No. 15/911,344 filed on Mar. 5, 2018, titled "Time-Based Network Operation Profiles in a Software-Defined Network" each of which are incorporated herein by reference.

TECHNICAL FIELD

This disclosure relates to software-defined networks. More particularly, this disclosure relates to switching between predefined network traffic flow/operation profiles based on events.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

FIG. 5B illustrates a block diagram of the networking device with a different network operation profile selected based on a change in the received event or a different received event.

FIG. 8 illustrates a flowchart of a specific example of a method for evaluating communications based on a network operation profile in between triggering start and stop events.

DETAILED DESCRIPTION

Figure 1:
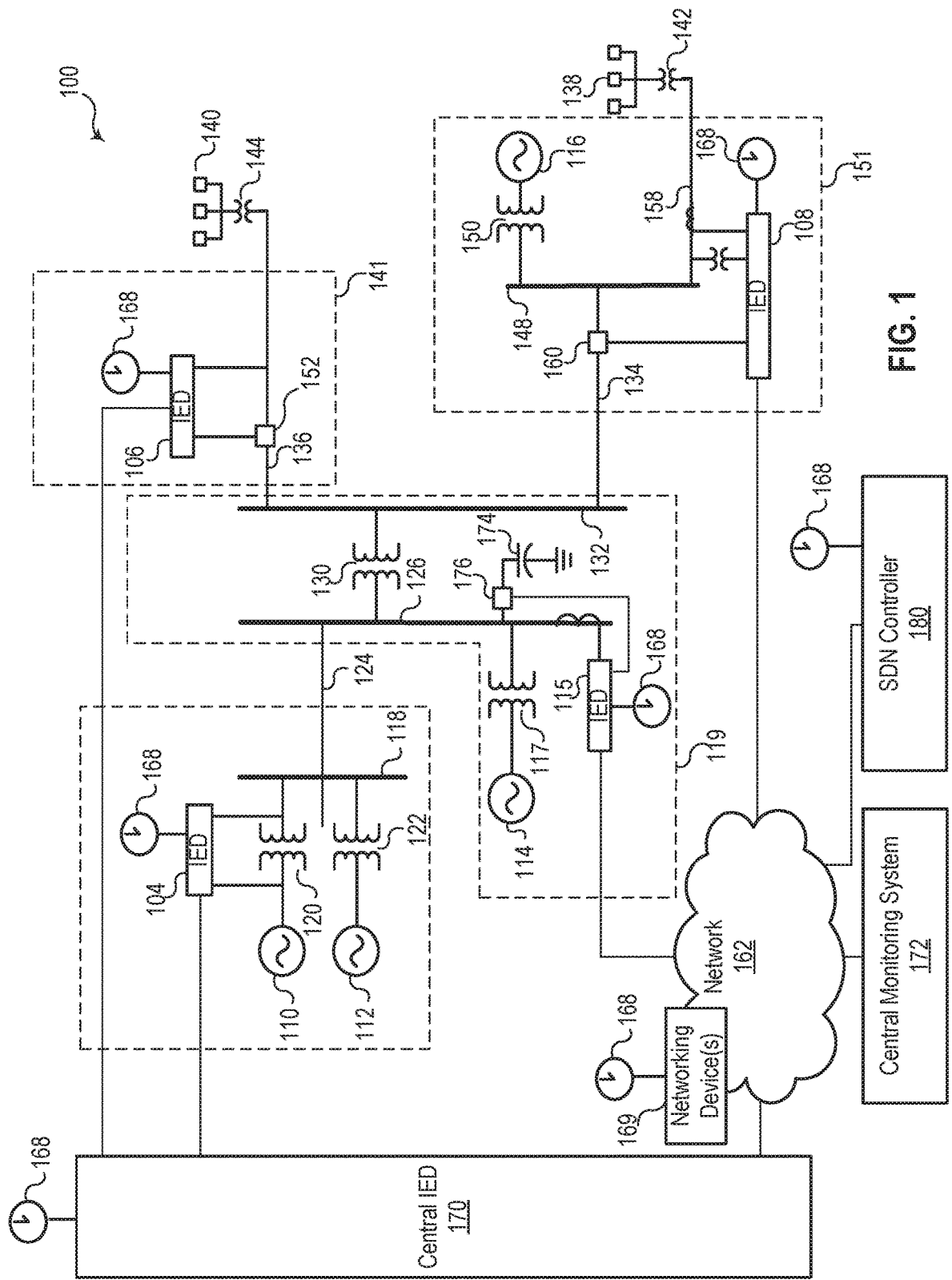
FIG. 1 illustrates an example of a simplified one-line diagram of an electric power transmission and distribution system in which various devices communicate via a software-defined network (SDN).

Electric power distribution and transmission systems include various monitoring and protection devices. A wide variety of communication and networking technologies may enable protection and monitoring functions within an electric power distribution or transmission system. Communication and networking devices may, among other things, facilitate an exchange of information, transmission of control instructions, and enable data acquisition. Some communication within an electric power distribution or transmission system may be time-sensitive. For example, protective actions may save lives or equipment if implemented quickly.

Critical infrastructure of an electric power distribution and transmission system is protected to prevent physical and electronic intrusion. For example, electric power systems (and the control, monitoring, and protective devices therein) may be subjected to cyber attacks. Some systems may incorporate software-defined network (SDN) technologies to regulate communications on a network interconnecting data stores, control devices, monitoring devices, protective devices, human interfaces, and/or other electronic equipment. A wide variety of data security and network control options are available using SDNs, including, without limitation, deny-by-default security, reduced jitter, more deterministic transport capabilities, failover planning, fault tolerance, path reliability analysis, etc.

A network engineer or other information technology (IT) technician may use an SDN flow controller (e.g., a software application running on a general-purpose computer) to program a networking device. Examples of networking devices applicable to the systems and methods described herein include, but are not limited to: switches, hubs, repeaters, gateways, routers, network bridges, modems, wireless access points, and line drivers. As used herein, the term "networking device" may, as the context allows, also encompass a wide variety of hybrid networking devices such as multilayer switches, protocol converters, terminal adapters, bridge routers, proxy servers, firewall devices, network address translators, multiplexers, network interface controllers, and the like. Thus, while many of the principles of the systems and methods are described herein using a network switch as an example, it is appreciated that such principles may be adapted for use with many other networking device types.

In some embodiments, a network engineer uses an SDN controller, or SDN flow controller, to dynamically program one or more networking devices. A network engineer may utilize an SDN controller to define a network operation profile to be implemented by one or more connected networking devices. A network operation profile may, among other things, define which data types are allowed on a network, the packet delivery path of the data between various devices on a network, prioritization of certain devices and/or data types, which devices are allowed to communicate on the network, which devices are allowed to communicate with certain other devices, etc.

As described above, a network engineer can use an SDN controller to program the networking device with a specific network operation profile. Once programmed, the networking device can continue to implement the defined network operation profile even if the SDN controller is offline or disconnected. When changes are needed or desired, the network engineer can use the SDN controller to modify the network operation profile or define a new network operation profile for the networking device. In some embodiments, the network engineer can use the SDN controller to modify the network operation profile in real time without disrupting data flow on the network.

In defining a network operation profile, a balance is typically struck between security, accessibility, and/or usability. For example, a network switch may be programmed with a network operation profile that prohibits Telnet communications from a physical access controller, such as a human-machine interface (HMI), to a relay of a power distribution system. Disabling Telnet communications to the relay may increase security, but also prevents easy access to the relay by an authorized operator. Per the embodiments described above, a network engineer may temporarily modify the network operation profile of the network switch to allow the authorized operator to interact with the relay via Telnet communications.

Telnet communications may be manually enabled through the use of an SDN flow controller, such as a software application running on a general-purpose computer. Such a process may require multiple users, take a substantial amount of time, require reprogramming of one or more networking devices, and/or be otherwise cumbersome and susceptible to human error both in the reprogramming and in reverting to the original programming when the authorized operator is finished.

In a control system environment, various intelligent electronic devices (IEDs) are automated to communicate with one another on an SDN. In various embodiments, a system may determine a baseline state for machine-to-machine communications traffic between IEDs on an SDN. Some IEDs may send control system packet data at defined intervals, within a small window of jitter. For example, a master device may continuously or periodically poll a monitoring device (e.g., via DNP3 requests) to request information. The information received from the monitoring device may be used for protection, monitoring, and/or for updating information on a dashboard or HMI. In such an embodiment, communication between the master device and the monitoring device may occur on a consistent basis and a supervisory system may monitor such communication and establish a baseline expectation of communications between tens or even hundreds of IEDs on an SDN.

In some embodiments, a networking device within an SDN may be programmed with flow rules that include precise event conditions for accepting nominal packet forwarding that conforms to the established baseline. The system may establish baselines for each of a plurality of event windows.

Each event window begins with an event and ends with an event. An event may comprise a switch input, a keyboard input, a mouse input, a sensor input, one or more messages from one or more systems, and/or a time-related input such as time-of-day, date, or interval length. For example, a specific message on the network may serve as an event to initiate, modify, or end a window. In addition, a collection of events may be combined to generate an event. Event windows may begin with one type of event and end with the same type of event or a different event type. For example, an event window may begin at a specific time of day and end at the same or a different time of day. An event window may be measured in terms of years, hours, minutes, seconds, or fractions of seconds. An event window may begin when a system sends an alert and end when an operator or supervisory system verifies that an issue has been resolved. An event detection system, implemented via software, hardware, and/or firmware may comprise various sensors, analog inputs, or digital inputs. The event detection system (or subsystem of a larger system) may detect predefined events, according to any of the various embodiments described herein.

In some embodiments, the network flow may provide for specific sequencing of messaging. For example, messages of a first type may be prioritized over messages of a second type. A network operation profile may even ensure that certain types of messages are received before other types of messages. For instance, a message indicating an alarm contact close may be relayed and delivered before event report collection messages. Certain network traffic may be expected during certain times of the day, but not during other times of the day, or even those times of the day on weekends and holidays. Accordingly, a first baseline may be used for one event window and a second baseline may be used for a second event window. If network traffic deviates from the expected baselines within an event window, a networking device may be configured to drop the packet, copy and forward to a supervisory controller, conduct enhanced packet inspections to detect a threat, and/or provide an alert to a supervisory system and/or an operator.

As a specific example, a SCADA controller may poll monitoring devices every two seconds. If polling is observed at one second or fifteen seconds, the associated network packets may be marked as deviant and scrutinized or treated as described above. More generally, the system may identify network traffic that deviates from an established baseline as possible spoof injection packets that merit additional analysis.

In some embodiments, an SDN controller may be configured to modify the network operation profile of one or more networking devices during specific event windows. However, such an approach would be time-consuming to program, cumbersome, and/or require that the SDN controller be operational and connected to the networking devices at all times. In some embodiments, it may be desirable that the networking devices remain fully functional and able to implement all network flows and changes thereto even when an SDN controller is disconnected. A profile implementation subsystem may implement, via a processor of a networking device, the various network operation profiles. The profile implementation subsystem may utilize precise time inputs and/or inputs from an event detection subsystem to determine which of a plurality of network operation profiles should be implemented at a given time. A profile implementation subsystem may be implemented via hardware, firmware, and/or software.

Accordingly, this disclosure includes additional systems and methods relating to networking devices that, independent of an SDN controller, allow for switching between two or more stored network operation profiles based on event windows that may be defined by, but not limited to, one or more of: (i) start events, (ii) interrupt events, (iii) end events, (iv) time to live, (v) general time windows, and (vi) precise time windows. A time to live (TTL) approach allows for a programmed network operation profile (or sub-portion thereof) to be programmed to run for a defined amount of time until it expires. However, a TTL flow rule may not include a time period with a future start time. Rather, a TTL approach is typically programmed in real-time by a connected controller to begin running until an expiration time.

In another embodiment, an SDN may comprise network switches and/or other networking devices configured to reduce or eliminate packet loops using the TTL field of Internet Protocol (IP) packets. In such embodiments, a data packet may be transmitted within the SDN with a predefined TTL value, a TTL value set based on a destination within the SDN, and/or based on a level of traffic congestion on the SDN. Each network switch, router, or other networking device that forwards the packet may decrement the TTL value. One, some, or all the networking devices (or just the network switches) may be configured by the SDN controller to drop a packet upon determination that the TTL value within the TTL field of the IP packet is zero (or some other threshold value).

In some embodiments, networking devices may increment the TTL value if certain conditions are met. For example, during high level of traffic congestion, a packet may be expected to traverse a higher number of network switches. Thus, the TTL value may be set at a higher initial level and/or incremented by a supervisory networking device. Each subsequent networking device that receives the IP packet my decrement the TTL value and, when the TTL value reaches a threshold value, the IP packet may be dropped.

As a specific example, an SDN controller may program a plurality of networking devices, such as routers, switches, and the like, to function as part of an SDN. A network router may receive a data packet for routing within the SDN. The network router or a network switch may set the TTL field of the data packet with an initial TTL value. Each network switch within the SDN that receives the data packet may (i) compare the TTL value with a threshold value (e.g., zero) and (ii) decrement the TTL value by a preset amount. When any of the network switches matches the TTL value of the data packet with the threshold value, the data packet is dropped.

In various embodiments, event window selected network flows defined in terms of general and precise time windows may be based, at least in part, on established network traffic baselines for the given event window. A system may establish a baseline or "normal" traffic flow for a given event window defined in terms of any of a wide variety of measurable and/or identifiable network communication characteristics, including, but not limited to: the number of devices communicating during the event window, bandwidth usage between devices, total bandwidth usage, bandwidth usage on a particular port, bandwidth usage on a particular link, the types of devices communicating during the event window, the specific devices communicating during the event window, protocols used during the event window, total data rate, average data rate, etc.

Event windows solely based on time may be based on general time or precise time. For a general time event window, the system may establish baseline characteristics during a period of minutes, hours, days, weeks, or even months. For a precise time event window, the system may establish baseline characteristics during a period of minutes, seconds, or even fractions of seconds. Event windows may, as described above, be based on events associated with relative or absolute time signals. In other embodiments, event windows may be characterized as non-temporal event windows or parameter-based event windows that have start and/or stop triggers based on non-temporal inputs.

In some embodiments, a system may determine baseline characteristics based on measured data. For example, network communication characteristics may be measured during event windows corresponding to a general or precise time event window. Multiple measurements from multiple event windows may be averaged together in some embodiments. In other embodiments, ratings, specification, and/or configuration settings of various devices and/or protocols on the network may be used to establish a baseline. For example, information indicating that a SCADA controller on the network is configured to poll every two seconds may be incorporated into the baseline determination.

Using the baseline approach, a networking device may be programmed with distinct network operation profiles for two or more event windows. Each of the distinct network operation profiles may be based, at least in part, on established baseline network characteristics. The networking device may switch between the distinct network operation profiles seamlessly without interruption to the network or packet loss. Network operation profiles may alternatively or additionally include configuration settings unrelated to established baselines. In some embodiments, network operation profiles defined for one event window may be embedded or nested within network operation profiles defined for other event windows.

For example, for a time-based event window, a first network operation profile may be defined for a general time window corresponding to 20:00 hours until 05:00 hours. A second network operation profile may be defined for a general time window 05:00 hours until 20:00 hours. The first network operation profile may restrict or enhance packet inspections of communications from HMIs that are assumed to be unattended during the evening hours. The second network operation profile corresponds to traditional working hours and may loosen restrictions on communications from HMIs.

Additional network operation profiles based on precise time-based event windows may be implemented during the implementation of first and/or second network operation profiles defined in precise time event windows. For example, a profile selection module of a networking device may implement a network operation profile associated with the SCADA controller based on a precise time event to ensure that polling and responses are received at the expected two-second intervals. Communications from the SCADA controller or associated monitoring devices that deviate from expectations may be scrutinized, sent to an intrusion detection system, forwarded to an alarm system, and/or dropped from the network.

Networking devices may receive precise time inputs (PTI) using any of a wide variety of protocols, such as the precision time protocol (PTP), network time protocol (NTP), a global positioning system (GPS) signal, synchronized optical network (SONET) inputs, and/or the like. Precision time inputs may be used to implement network operation profiles by raising events that begin and end event windows. In some embodiments, networking devices may include an internal clock that provides a precision time signal. The internal clock may be calibrated once, periodically, and/or continually by an external precision time input.

Networking devices may utilize a precision time input to perform additional functions such as low-latency path identification, provisioning of new network flows, meeting quality of service (QoS) requirements, implementing real-time protection schemes, etc.

As another specific example, a network engineer may use an SDN controller to configure a network switch with two distinct network operation profiles. The two distinct network operation profiles are stored in a memory of the networking device for selective implementation during event windows. The networking device may receive a precise time event via timing input (e.g., via a PTP or NTP input). The SDN controller may then be disconnected from the network switch.

A first network operation profile may prevent Telnet communications on the network and a second network operation profile may allow Telnet communications on the network. The first network operation profile may be implemented by default to provide increased security on the network by preventing Telnet communications. However, the second network operation profile that allows Telnet communications may be automatically implemented during a predefined event window. This event window may begin and end with any type of event.

As used herein, a network operation profile may define any of a wide variety of network elements. For example, a network operation profile may define the port forwarding configurations, device privileges, user privileges, load balancing, network address translation handling, traffic routing, traffic prioritization, packet size, allowed protocols, virtual local area network changes, redundancy routing, port mirroring, traffic segmentation, data logging configurations, quality of service settings, selective virtual local area network configurations, port trunking, port access control lists (PACLs), virtual access control lists (VACLs), ring topologies, packet dropping, and other networking device settings. In some embodiments, a network operation profile may alternatively or additionally define a specific physical path for network communication between particular devices, message types, or other defining message or device characteristic.

There are too many permutations and combinations of networking device settings to list them all. Accordingly, this disclosure includes a few examples with the understanding that many more combinations are possible. Moreover, the variations in network operation profiles may also vary significantly based on the type of networking device being configured. For example, a network operation profile for a managed switch may not include DHCP settings. In contrast, a network operation profile for a router may include DHCP settings. Similarly, a network operation profile for a firewall or edge router device might include different network operation profile settings than a repeater would. A network operation profile for an intrusion detection system may include various settings related to baseline comparisons and complex analysis functions, while an unmanaged network switch may include relatively simple configuration settings.

The specific settings applicable to a network operation profile depend largely on the type of networking device being configured and will be appreciated by one of skill in the art. Regardless of the available and applicable configuration settings, the systems and methods described herein modify the functionality of such devices by allowing them to store two or more network operation profiles that are associated with an event window to begin implementation and end implementation.

As another example, a profile selection module of a network switch may implement a first network operation profile during a first event window. The first network operation profile may prevent certain communication protocols, limit communication between certain devices, and have a defined port-forwarding table. The profile selection module may implement a second network operation profile during a second event window. The second network operation profile may, for example, cause the network switch to create two virtual local area networks (VLANs), allow some previously disabled communication protocols, and/or allow for communication between two devices that was previously prevented. The profile selection module may be implemented in hardware, firmware, and/or software.

In some embodiments, a single network operation profile may utilize a precision time input to monitor network communication flows. As described above, the network operation profile may set forth baseline expectations for DNP3 poll requests and responses. If network communication flows deviate from the established baseline expectations, an event may be raised, an operator or supervisory system may be alerted, the communication may be prevented, and/or the state of the network may be changed to a different network operation profile that is more restrictive to provide increased security.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as general-purpose computers, computer programming tools and techniques, digital storage media, virtual computers, virtual networking devices, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from any of a wide variety of companies and may operate using a wide variety of known protocols over various types of physical network connections, such as twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism. Thus, it is appreciated that the systems and methods described herein are not limited to the specific network types described herein. Rather, any of a wide variety of network architectures may utilize the systems and methods described herein.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc. that perform one or more tasks or implement particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an embodiment of a simplified one-line diagram of an electric power transmission and distribution system 100 in which a plurality of communication devices facilitate communication in a software-defined network (SDN) consistent with embodiments of the present disclosure. The electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136 and 158), circuit breakers (e.g., breakers 152, 160, 176), busses (e.g., busses 118, 126, 132, and 148), loads (e.g., loads 138 and 140) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to the bus 126 through a step-up transformer 117. The bus 126 may be connected to a distribution bus 132 via a step-down transformer 130. Various distribution lines 136 and 134 may be connected to the distribution bus 132. The distribution line 136 may lead to a substation 141 and the line may be monitored and/or controlled using an IED 106, which may selectively open and close a breaker 152. A load 140 may be fed from the distribution line 136. A step-down transformer 144 in communication with the distribution bus 132 via the distribution line 136 may be used to step down a voltage for consumption by the load 140.

The distribution line 134 may lead to a substation 151 and deliver electric power to the bus 148. The bus 148 may also receive electric power from the distributed generator 116 via a transformer 150. The distribution line 158 may deliver electric power from the bus 148 to the load 138 and may include another step-down transformer 142. The circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal 168 may be distributed throughout system 100. Utilizing a common or universal time source may ensure that IEDs have a synchronized time signal that can be used to generate time-synchronized data, such as synchrophasors. In various embodiments, IEDs 104, 106, 108, 115, and 170 may receive a common time signal 168. The common time signal 168 may be distributed in system 100 using a communications network 162 or using a common time source, such as a Global Navigation Satellite System ("GNSS"), or the like. The common time signal 168 may be distributed using, for example, PTP or NTP protocols.

According to various embodiments, the central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170 and may communicate over various media such as a direct communication from IED 106 or over a wide-area communications network 162, such as via a virtual private network (VPN). According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via the communication network 162 may be facilitated by networking devices 169. One or more of the networking devices 169 may receive the common time signal 168. Examples of networking devices 169 include, but are not limited to, multiplexers, routers, hubs, gateways, firewalls, and switches. In some embodiments, IEDs and networking devices may comprise physically distinct devices. In other embodiments, IEDs and networking devices may be composite devices or may be configured in a variety of ways to perform overlapping functions. IEDs and networking devices may comprise multi-function hardware (e.g., processors, computer-readable storage media, communications interfaces, etc.) that can be utilized to perform a variety of tasks that pertain to network communications and/or the operation of equipment within system 100. Thus, the terms "networking device" and "IED" may be used interchangeably in some instances to the extent that the IED is interacting with a network (e.g., an SDN) and/or to the extent that a networking device is performing a function of an IED as described herein.

An SDN controller 180 may be configured to interface with one or more of the networking devices 169. The SDN controller 180 may facilitate the creation of an SDN within the network 162 that facilitates communication between various devices, including IEDs 170, 115, 108, and central monitoring system 172. In various embodiments, the SDN controller 180 may be configured to interface with a control plane (not shown) in the network 162. An operator may use the SDN controller 180 to define (e.g., program) network operation profiles of one or more networking devices and/or IEDs connected to the network 162. One or more of the network operation profiles may be configured for implementation during a time window. The common time input 168 may provide a precise time input to the networking devices 169. The various networking devices 169 may raise events on a network 162. An SDN may implement one or more event-based network operation profiles during a defined event window.

The event window may be initiated by a non-temporal event that results in the implementation of network operation profile. The SDN controller 180 may define the event window to end based on a second event. The second event may be parameter-based or temporal. For example, the event window may be defined to begin upon detection of a particular type of network activity. The detection of the particular network activity results in the automatic implementation of a new network operation profile. The SDN may implement the new network operation profile for a particular amount of time (e.g., a temporal event) or until a second triggering event occurs.

The networking devices 169 may use the precise time from the common time input 168 to implement time-based functions within the network operation profile. For example, a network operation profile implemented by one of the networking devices 169 may define an expected baseline communication between IED 115 and central IED 170. The networking device may determine that the precise timing of communications between IED 115 and central IED 170 deviates from an expected timing of communication as set forth in the network operation profile. The network operation profile may set forth the response or behavior of the networking device 169 in the event of such a deviation. For example, the networking device 169 may be configured to forward the deviant communications to the central IED 170 and raise an alert. Alternatively, the network operation profile may instruct the networking device 168 to drop deviant packets or forward deviant packets to an intrusion detection system in addition to or instead of central IED 170.

Figure 2A:
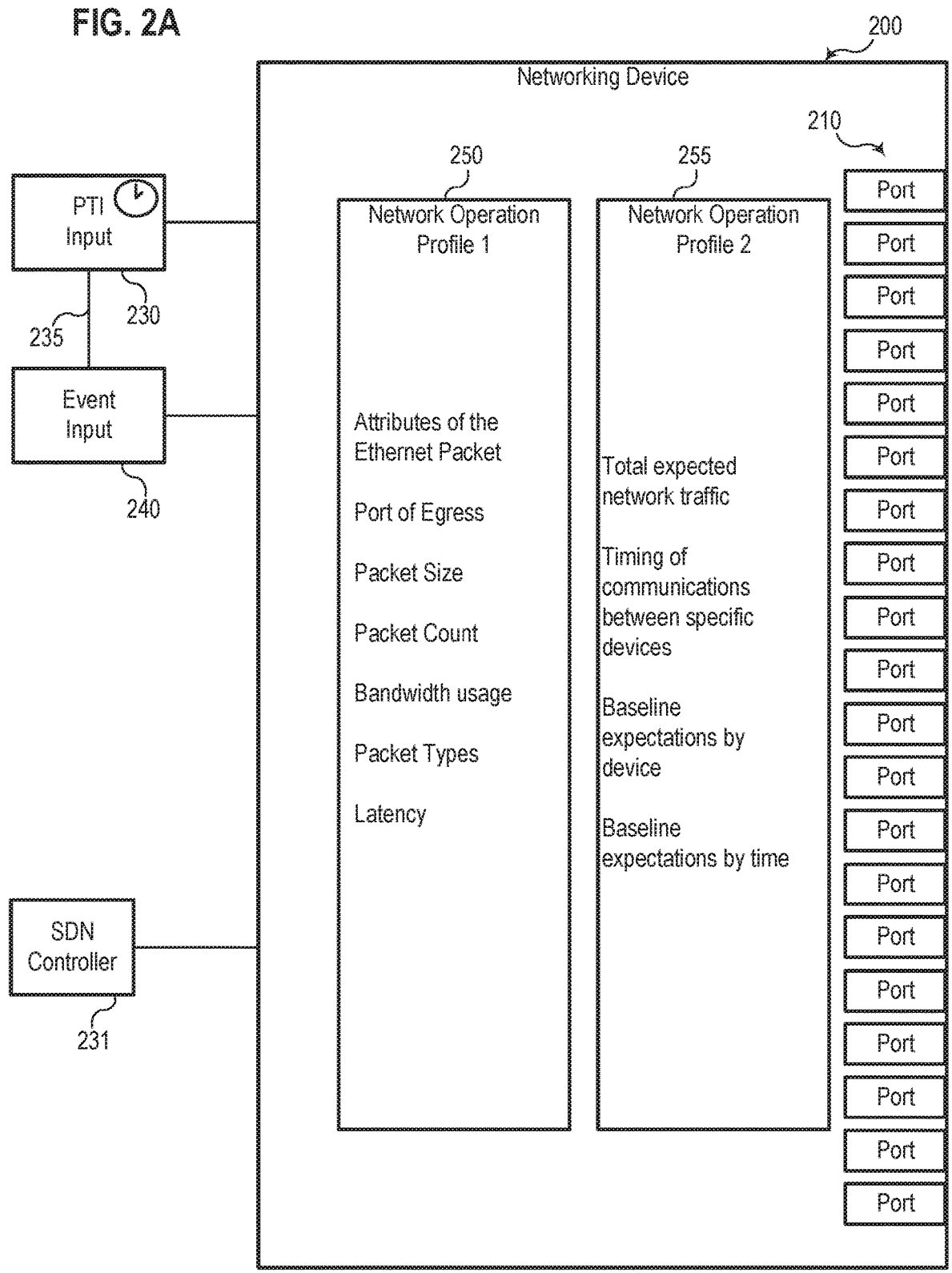
FIG. 2A illustrates a block diagram of a networking device with two network operation profiles defined by an SDN controller to be implemented in response to time-based and/or event-based network flow rules.

FIG. 2A illustrates a block diagram of a networking device 200 with two network operation profiles 250 and 255 defined by an SDN controller 231. The networking device 200 selects which operation profile 250 or 255 is used based on the non-temporal event input 240 selects. Precision time input (PTI) 230 is available to both event input 240 via connection 235 and the networking device 200 implementing the selected operation profile 250 or 255. As illustrated, the networking device 200 may include any number of network communication ports 210. In some embodiments, the SDN controller 231 is connected via one of the network communication ports 210. A network engineer or other user may define a first network operation profile 250 to implement a first network flow.

The first network operation profile 250 may set forth any number of network settings and/or functionalities, including but not limited to: port forwarding configurations, device privileges, user privileges, load balancing, network address translation handling, traffic routing, traffic prioritization, packet size, allowed protocols, virtual local area network changes, redundancy routing, port mirroring, traffic segmentation, data logging configurations, quality of service settings, selective virtual local area network configurations, port trunking, port access control lists (PACLs), virtual access control lists (VACLs), ring topologies, packet dropping, and other networking device settings.

The SDN controller 231 may be used to define a second network operation profile 255 with a different combination of settings. In the illustrated embodiment, the second network operation profile 255 does not modify the actual network flow. Instead, the second network operation profile 255 may include time-based network flow monitoring rules (referred to herein as "time-based rules" or "time-based flow rules"). For example, the second network operation profile 255 may define a baseline expectation for network traffic during a precise time window. The second network operation profile 255 may define an action to be implemented by the networking device 200 if the network traffic exceeds the baseline expectation during the precise time window.

The second network operation profile 255 may set forth communication timing expectations between specific devices (e.g., timing expectations for SCADA or DNP3 polling). The second network operation profile 255 may set forth baseline expectations for specific devices. An IED may be expected to respond to DNP3 polling within 900 milliseconds of receiving a DNP3 request from a supervisory device. The second network operation profile 255 may identify the precise time (using PTI 230) the IED receives the DNP3 request from the supervisor device. Responses from the IED that are outside of the 900-millisecond precise time window may be ignored, dropped, forwarded to an intrusion detection system, or otherwise marked as deviant.

In various embodiments, the first network operation profile 250 may be implemented during an event window, where an event window begins and ends based on the detection (or failure to detect) one or more events or combination of events. Events may include input(s) via one or more switches, keys, mouses, sensors, and/or other user input devices. In some embodiments, events may include one or more messages from one or more systems or a time-related input, such as time-of-day, date, or interval length. In addition, a collection of events may be combined to generate an event. Event windows may begin with one type of event and end with the same type of event. Event windows may be triggered (e.g., initiated, modified, or terminated) based on the presence of a specific packet, total bandwidth usage, bandwidth usage by a particular device or between two particular devices, measured latency, packet counts, packet size, and/or other packet, message, or bandwidth characteristics.

In other embodiments, an event window may begin with one type of event and end with a different type of event. In some embodiments, an IED may be configured to implement a network operation profile during an event window that begins based on a temporal event and ends based on the detection of a non-temporal event. In still other embodiments, a networking device may begin implementing a particular network operation profile in response to a non-temporal start event. The networking device may cease to implement the particular network operation profile at the end of the event window. The end of the event window may be defined in terms of detecting a second event. An interrupt event may be an event that ends or modifies the implemented network operational profile prior to the normally expected end.

As previously described, an event window may begin at a specific time of day and end at the same or a different time of day, and may be measured in terms of years, hours, minutes, seconds, or fractions of seconds. An event window may begin when a system sends an alert and end when an operator verifies the issue has been resolved.

One embodiment of a temporal event window is based on time of day such as during working hours or after hours. The general time event window may be defined using a 24-hour clock. For example, the first network operation profile 250 may be configured to run always, between 14:00 and 22:00 hours, or within another time window defined according to a 24-hour clock. Alternative timekeeping approaches other than a 24-hour clock can be used. Time-based, or temporal, event windows may be facilitated by the PTI 230 sending time information to the event input 240 via connection 235. In some embodiments, the second network operation profile 255 may be thought of as modifying the behavior of the first network operation profile 250 during precise time event windows and/or in response to network events that trigger time-based rules (i.e., a network event trigger), rather than as defining a completely new network operation profile.

Figure 2B:
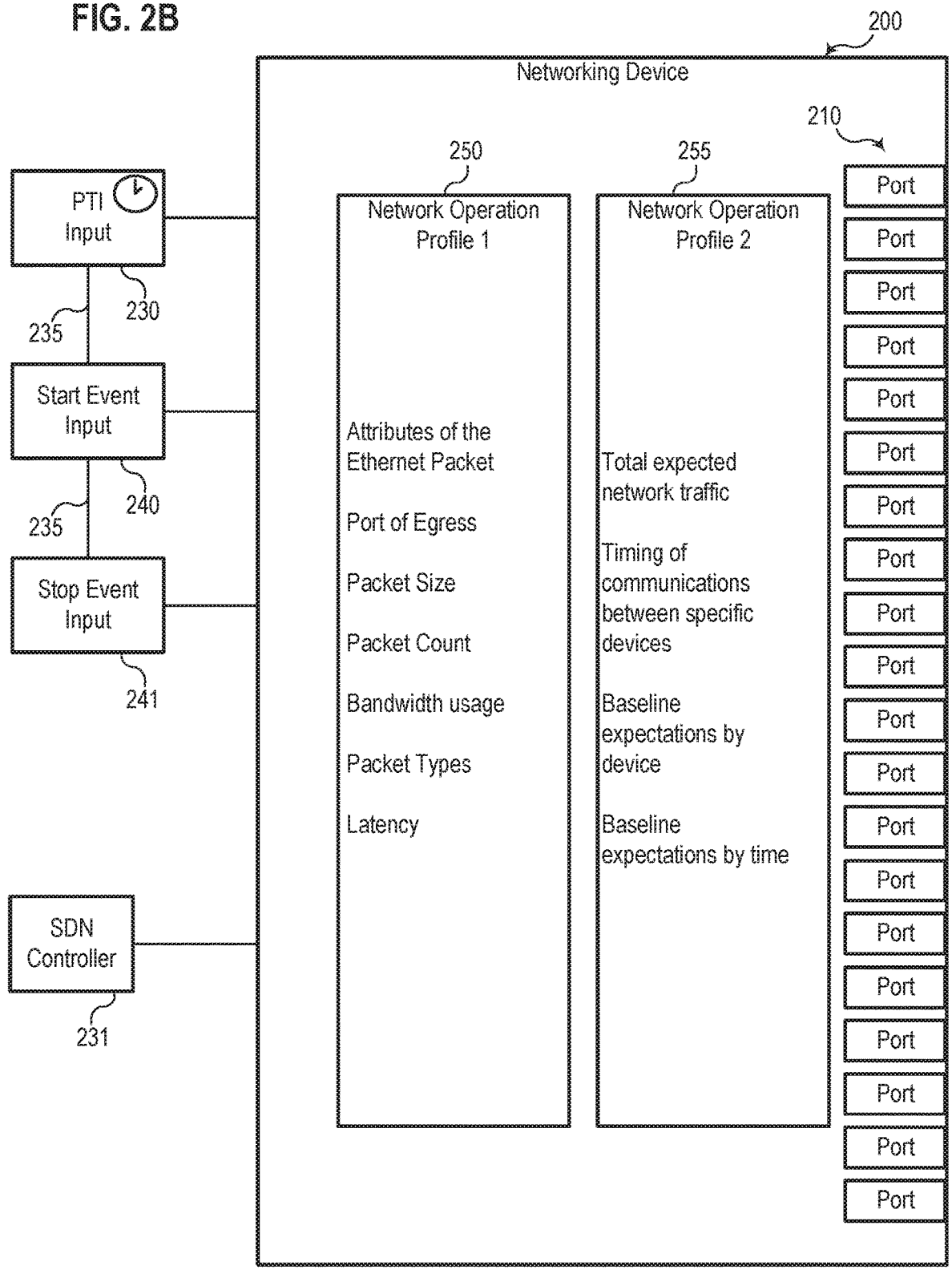
FIG. 2B illustrates a block diagram of the networking device with two network operation profiles selectable based on a combination of two event inputs.

FIG. 2B illustrates a block diagram of the networking device 200 with the two network operation profiles 250 and 255. The networking device 200 may select one of the two network operation profiles 250 or 255 based on the PTI 230, the start event input 240, and/or the stop event input 241. In one specific example, the first network operation profile 250 is used exclusively during some time windows based on the PTI 230. During other time windows, the networking device 200 may implement the first network operation profile 250 by default. When the start event input 240 is raised, the networking device 200 may implement the second network operation profile 255. The networking device 200 may implement the second network operation profile 255 until the stop event input 241 is raised.

Figure 3A:
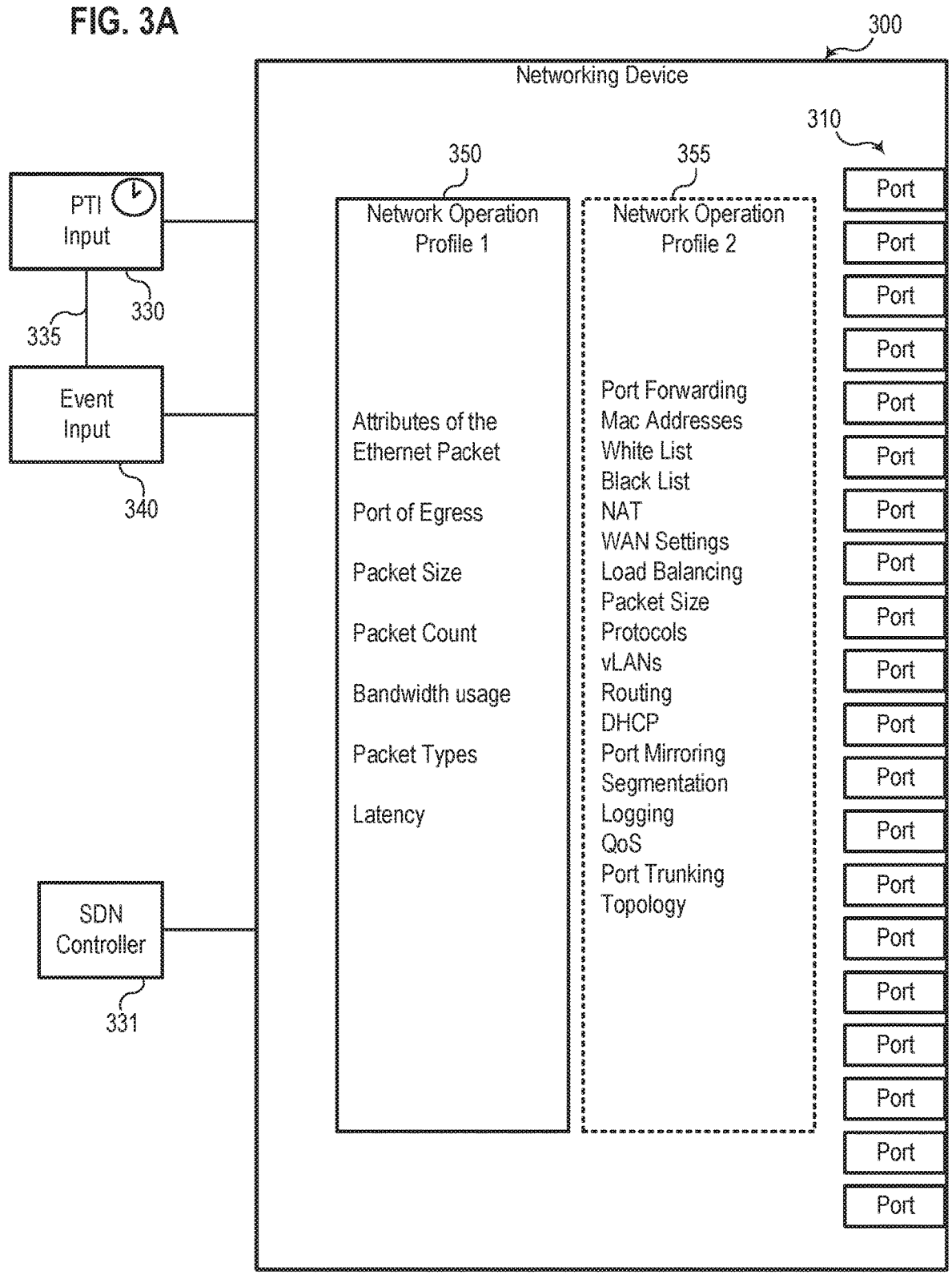
FIG. 3A illustrates a block diagram of the networking device with two network operation profiles stored for implementation based on an event input.

FIG. 3A illustrates a block diagram of the networking device 300 with the two network operation profiles 350 and 355 stored for implementation during different event windows, even when an SDN controller 331 is disconnected. The networking device 300 utilizes the event input 340 to select which of the two operation profiles 350 or 355 are used at any given time. A PTI 330 provides a precise time to the networking device 300 and the event input 340 via connection 335. In some embodiments, PTI 330 and event input 340 are provided via one of ports 310 even though they are shown as separate/unique ports for convenience in the illustrated embodiment. A network engineer or other user may define each of the first 350 and second 355 network operation profiles to implement distinct network flows.

The first network operation profile 350 may set forth any number of network settings and/or functionalities, including but not limited to: port forwarding configurations, device privileges, user privileges, load balancing, network address translation handling, traffic routing, traffic prioritization, packet size, allowed protocols, virtual local area network changes, redundancy routing, port mirroring, traffic segmentation, data logging configurations, quality of service settings, selective virtual local area network configurations, port trunking, port access control lists (PACLs), virtual access control lists (VACLs), ring topologies, packet dropping, and other networking device settings.

The second network operation profile 355 may set forth a number of changes to the first network operation profile 350 and/or define a new set of network settings and/or functionalities. Each of the first 350 and second 355 network operation profiles are selected by the event input 340. The event input may be time-based with the time being provided by the PTI 330 via connection 335. In the illustrated embodiment, the first network operation profile 350 is associated with a time event window of 20:00 to 05:00 each day. The second network operation profile 355 is associated with a time event window of just after 05:00 until just before 20:00. The event input 340 may use the precision time provided by PTI 330 to transition between the two network operation profiles 350 and 355 at the established times. FIG. 3A illustrates the first network operation profile 350 being implemented (solid lines), while the second network operation profile remains inactive, but stored in memory.

Figure 3B:
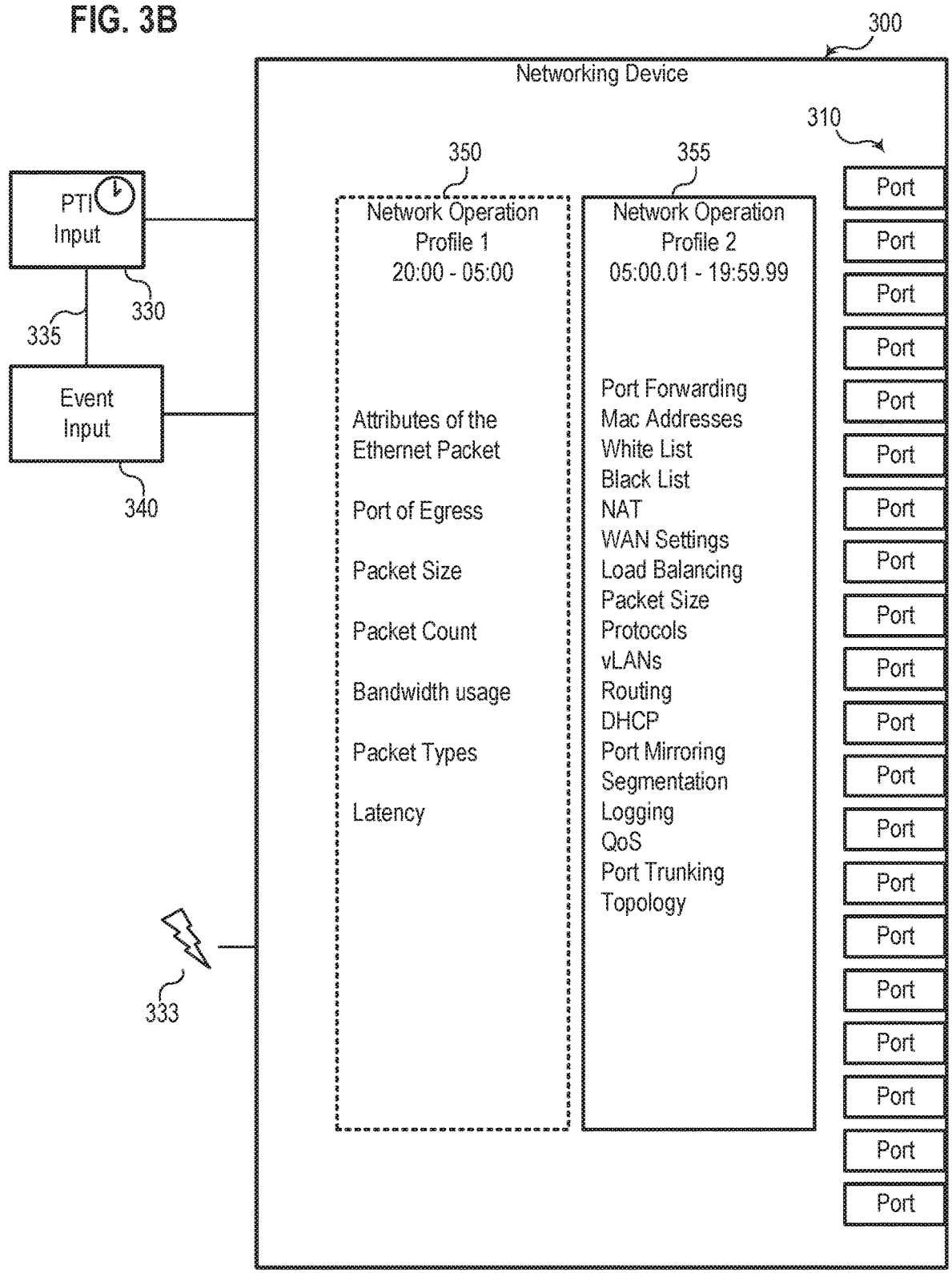
FIG. 3B illustrates a block diagram of the networking device with the second network operation profile selected based on the event input, even though an SDN controller is offline.

FIG. 3B illustrates the networking device 300 implementing the second network operation profile 355 based on the precise input event time from the PTI 330 sent to the event input 340 via connection 335 and data from the event input 340. The transition between the first 350 and second 355 network operation profiles occurs independently of the SDN controller, shown disconnected at 333. As illustrated, at 333, the SDN controller can be disabled or disconnected from the networking device 300 without impacting the functionality of the networking device 300 and/or the ability to transition between event-based network operation profiles 350 and 355.

Figure 4A:
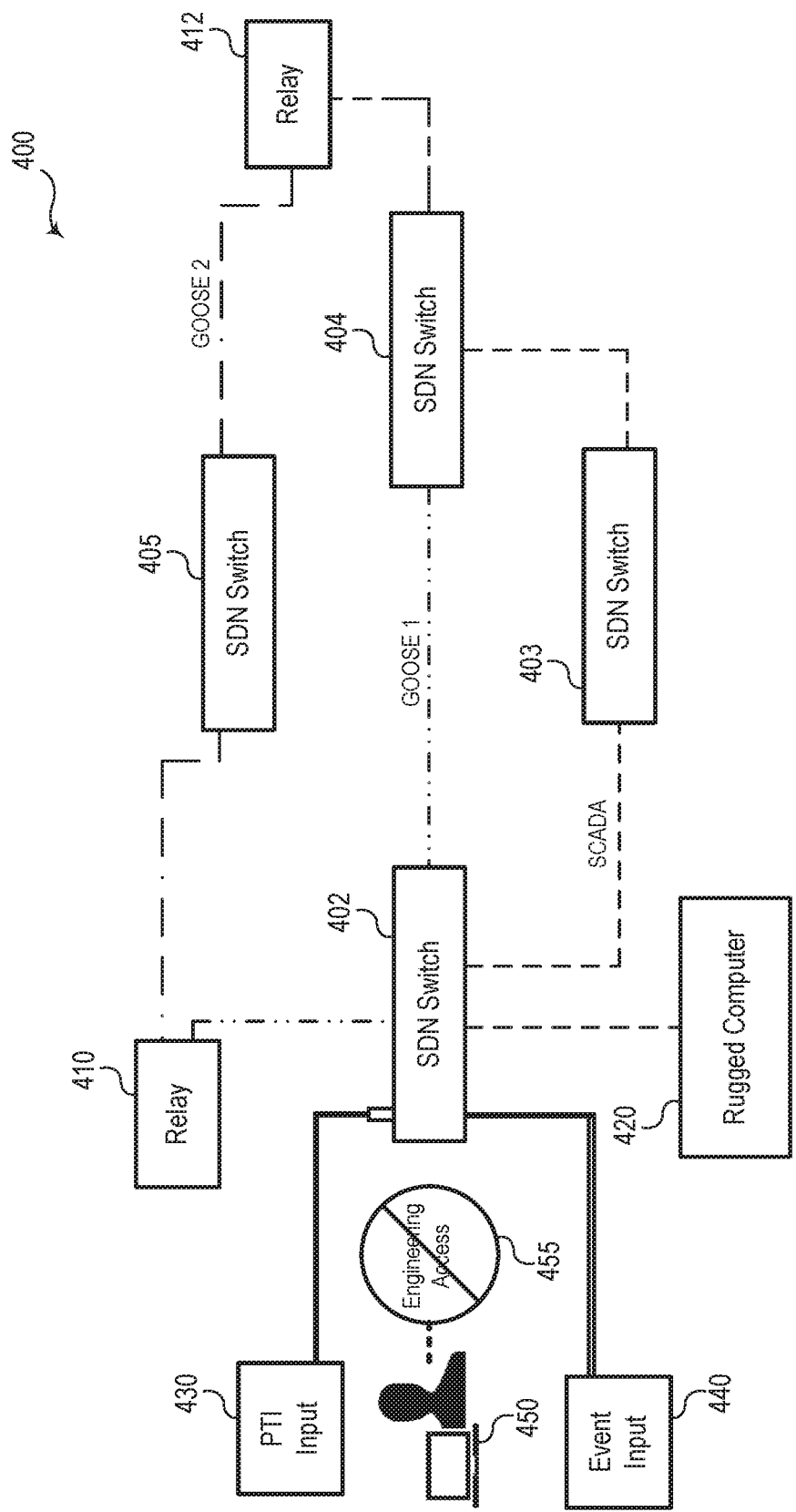
FIG. 4A illustrates a simplified diagram of an SDN with a plurality of networking devices, at least one of which is implementing a first network operation profile that disables engineering access via a human-machine interface (HMI) based on an event input.

FIG. 4A illustrates a simplified diagram on an SDN 400 with a plurality of networking devices, at least one of which is implementing a first network operation profile that disables engineering access, at 455, via a human-machine interface (HMI) 450. Implementation of the first network operation profile may be based on an event input 440. The system may utilize a PTI 430 for synchronization and communication. In this implementation, the event input 440 is raised based on user input, supervisory system input, or detected network traffic. The SDN switch 402, for example, may utilize the event input 440 to select between a plurality of available network operation profiles. As illustrated, the SDN 400 may include SDN switches 402, 403, 404, and 405. The SDN network may also include a rugged computer 420 and relays 410 and 412. Various communication protocols and communication paths may be utilized. The SDN switch 402 and/or SDN switches 403, 404, and 405 may implement a first network operation profile during a first event window that allows for the illustrated network flows using GOOSE and SCADA protocols. However, the first network operation profile may not allow engineering access 455 and/or associated protocols.

Figure 4B:
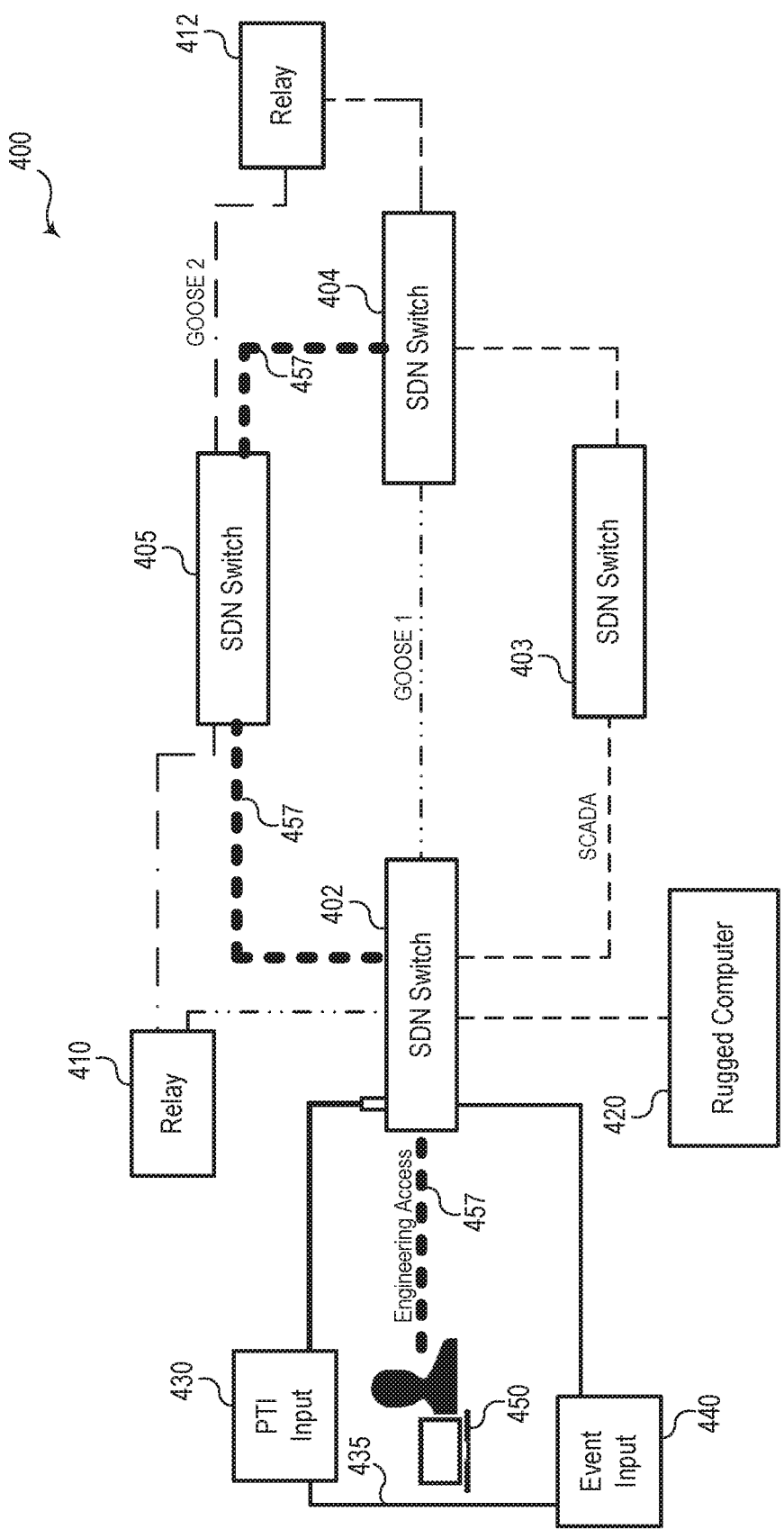
FIG. 4B illustrates a simplified diagram of the SDN with at least one of the networking devices implementing a second network operation profile based on the received event input, where the second network operation profile enables engineering access.

FIG. 4B illustrates a simplified diagram of the SDN 400 with at least one of the networking devices (e.g., SDN switches 402, 403, 404, and 405) implementing a second network operation profile based on the event input 440. In this implementation, the event input 440 is time-based and obtained from the precision time input (PTI) port 430 via connection 435. As illustrated, the second network operation profile allows engineering access 457 via HMI 450. The engineering access 457, including various connections and associated protocols, is shown as a new network flow between HMI 450, SDN switch 402, SDN switch 405, and SDN switch 404. In some embodiments, other network operation profiles may allow still other network flows between other devices and/or utilizing still other protocols.

Figure 5A:
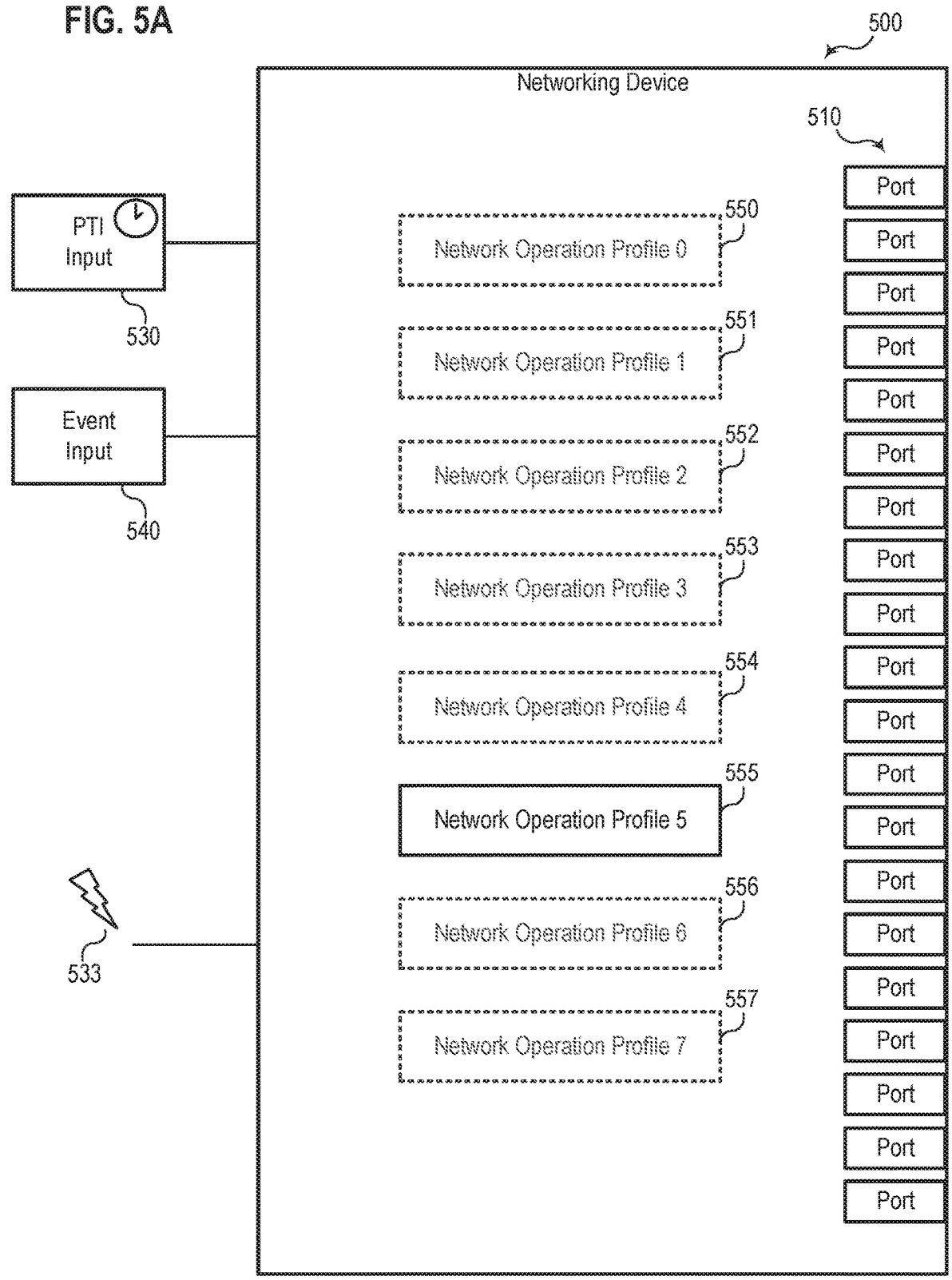
FIG. 5A illustrates a block diagram of a networking device with eight network operation profiles selectable based on received events.

FIG. 5A illustrates a block diagram of a networking device 500 with eight network operation profiles (550-557) that are each associated with a distinct event window. The networking device 500 implements a given network operation profile (550-557) based on an event window. As previously described, events may originate from any of a wide variety of sources. An event input may be analog or digital and may comprise a single electrical connection or a plurality of parallel connections. One embodiment of an event is based on time and may be provided by precise time input PTI 530. As illustrated, there is no SDN controller 533 connected to the networking device 500 to modify network flows (e.g., by modifying a network operation profile). In some embodiments, multiple network operation profiles may share overlapping event windows. Conflict settings of the networking device and/or set forth as part of the network operation profiles may resolve any conflicts between concurrently implemented network operation profiles.

In some embodiments, one of the network operation profiles 550-557 may be assigned as a default network operation profile that is implemented when none of the other network operation profiles 550-557 are being implemented (e.g., when there is not an event window associated with a network operation profile 550-557). In the illustrated embodiment, the sixth network operations profile 555 is implemented based on the event input 540.

FIG. 5B illustrates a block diagram of the networking device 500 with network operation profile 554 selected based on the event input 540. As previously described, network operation profile 554 may provide for different network flows than the network operation profile 555. Transition to network operation profile 554 from network operation profile 555 may be seamless (e.g., without any network disruption) and occur even when an SDN controller is offline, at 533.

Figure 5C:
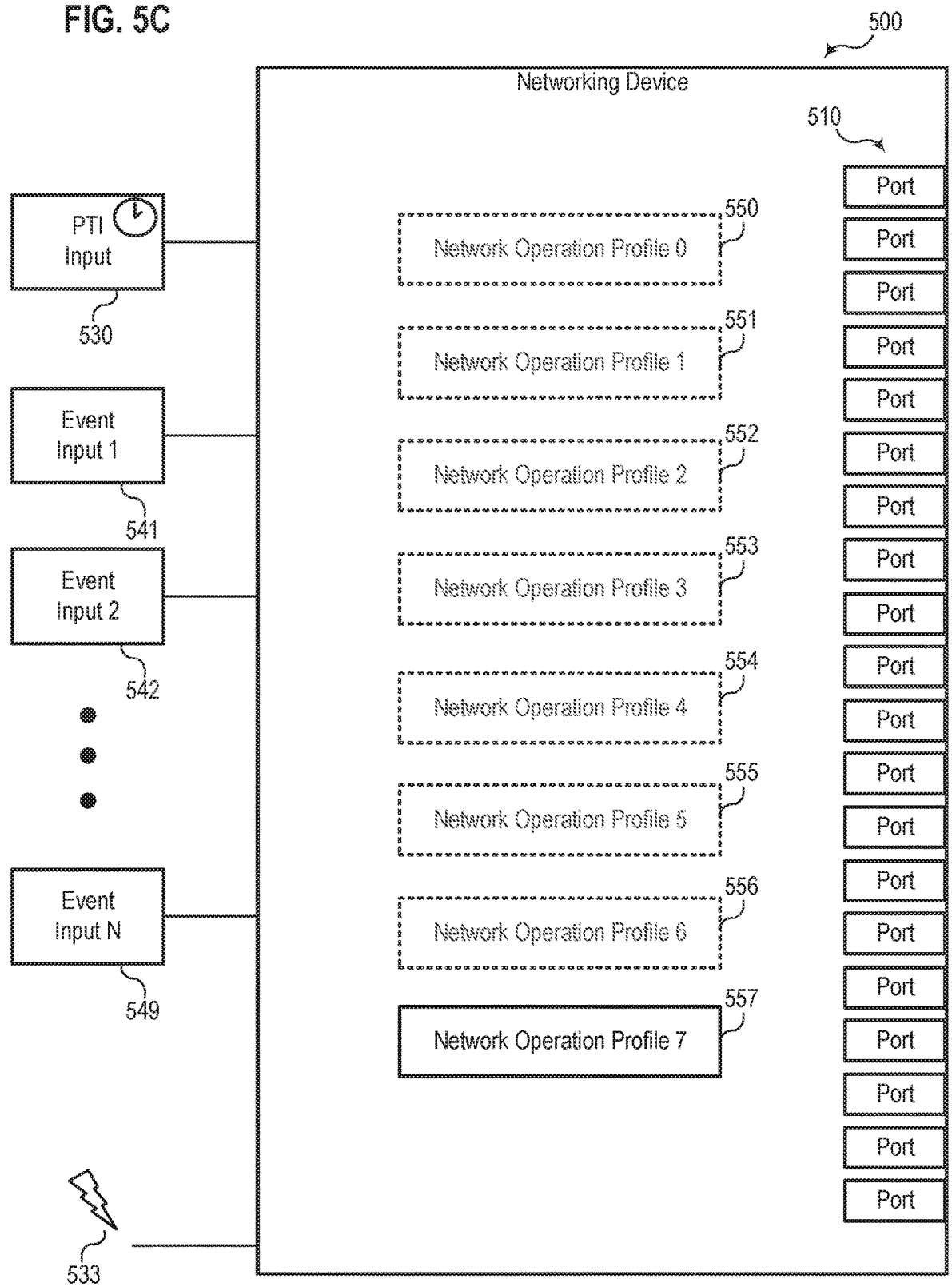
FIG. 5C illustrates a block diagram of the networking device with the plurality of network operation profiles that are selectable based on a combination of various event inputs.

FIG. 5C illustrates a block diagram of the networking device 500 with the plurality of network operation profiles 550-557 that are selectable based on a combination of various event inputs 541-549. The networking device 500 may utilize the various event inputs 541-549 to determine which of the one or more network operation profiles 541-549 to implement. The networking device 500 is shown implementing network operation profile 7 at 557.

Figure 6:
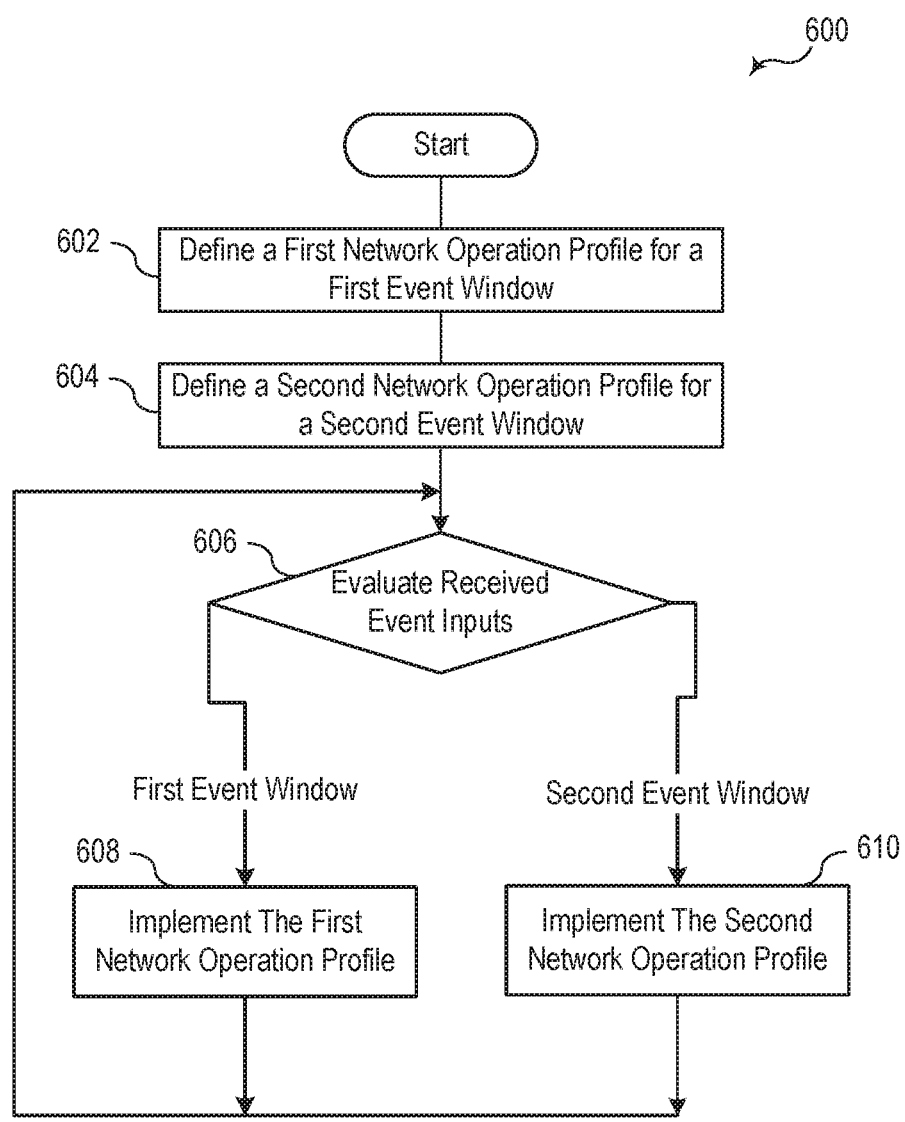
FIG. 6 illustrates a flowchart of an example of a method for selecting between two network operation profiles based on received event inputs.

FIG. 6 illustrates a flowchart of an example of a method 600 for selecting between two network flows associated with distinct network operation profiles selected based on which of a first event window and a second event window is asserted. A first network operation profile is defined, at 602, for implementation during a first event window. For example, an SDN controller may define, at 602, a first event-based network operation profile. The SDN controller may define, at 604, a second event-based network operation profile for implementation during a second event window. The networking device may intermittently or continually evaluate the status of the event input, at 606. If the event input corresponds to the first event window, then the networking device may implement, at 808, the first network operation profile. If the event input corresponds to the second event window, the networking device may implement, at 610, the second network operation profile. One of the first and second network operation profiles may be assigned as a default network operation profile in the event that the event input does not correspond to either of the associated network operation profiles. In other embodiments, the networking device may require that the defined networking operation profiles be associated with event windows that encompass all possible events.

Figure 7:
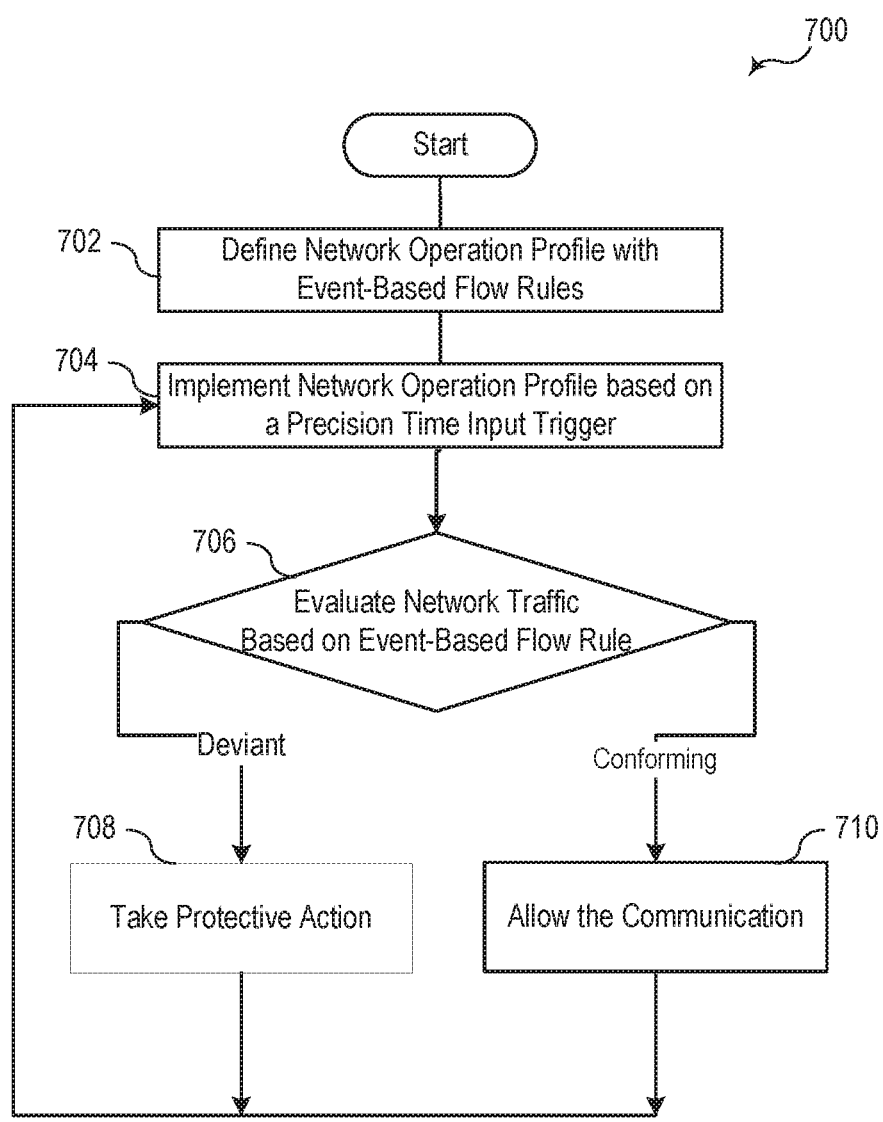
FIG. 7 illustrates a flowchart of a general example of a method for evaluating network traffic based on event-based flow rules during a precision time window.

FIG. 7 illustrates a generalized flowchart of an example of a method 700 for implementing a time-based rule of a network operation profile. An operator may use an SDN controller to define, at 702, a network operation profile with one or more event-based flow rules. The event-based flow rules may be implemented at any time, or only during present precise time windows. A rule-based network operation profile may have a defined start time associated with a temporal value of the PTI, and be defined to stop based on a non-temporally triggering "stop" event. As illustrated, event-based flow rules are used to evaluate the network traffic, at 706. If the network traffic is deviant from a defined expectation, the networking device may take protective action, at 708. For example, the networking device may prevent the communication, send an alert, and/or forward the communication to a supervisory system. If the communication conforms to the specifications of the event-based rule, the communication may be allowed, at 710, without interruption. The time-based rule described above may be described as utilizing a time-based network operation profile configured to be implemented during an event window, where the event window has an end time defined as a function of the start time and where the start time is defined with respect to a triggering event.

FIG. 8 illustrates a flowchart of a specific example of a method for implementing an event-based network operation profile. An SDN controller may define a network operation profile with one or more event-based flow rules, at 802. Once a start event is detected, at 804, the system may implement the event-based network operation profile. Until the stop event is detected, at 808, the network operation profile may be implemented, at 806. Once the event-based network operation profile is stopped, at 808, the network device may automatically revert to a previous network operation profile or advance to a predetermined network operation profile, at 810.

The methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified and/or steps or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer-executable code located within a memory device and/or transmitted as transitory or nontransitory electronic signals over a system bus or wired or wireless network. Many of the embodiments described herein are shown in block diagram form and/or using logic symbols. It is appreciated that various elements of each of the illustrated and described embodiments could be implemented using FPGAs, custom application specific integrated circuits (ASICs), and/or as hardware/software combinations.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A method of operating a software-defined network (SDN), comprising:
   defining, via a software-defined network controller (SDN controller), a first network flow to be implemented by a plurality of networking devices connected as part of the SDN;
   receiving a data packet via a network router of the SDN;
   setting a Time to Live (TTL) value of the data packet;
   sequentially transmitting the data packet to each of a plurality of network switches within the SDN;
   modifying, by each of the plurality of network switches that sequentially receives the data packet, the TTL value by:
      decrementing, by each network switch that sequentially receives the data packet, the TTL value, and
      incrementing, by at least one network switch that detects a level of traffic congestion above a congestion threshold, the TTL value;
   comparing, by each network switch, the TTL value with a TTL threshold value and forwarding the data packet based on a non-match;
   receiving the data packet at a subsequent network switch of the SDN;
   matching, by the subsequent network switch, the modified TTL value of the data packet to the TTL threshold value; and
   dropping the data packet based on the matched TTL value with the TTL threshold value.

2. The method of claim 1, wherein the TTL threshold value is zero (0), such that the data packet is dropped by a network switch matching the TTL value with the TTL threshold value.

3. The method of claim 1, further comprising receiving a precise time signal via a precision time input port, and
   modifying the first network flow based on the received precise time signal.

4. The method of claim 1, further comprising:
   detecting a network event via an event detection port of one of the plurality of networking devices; and
   modifying the first network flow based on the detected network event.

5. The method of claim 1, wherein the setting of the TTL value of the data packet is based on a destination of the data packet within the SDN.

6. The method of claim 1, wherein the setting of the TTL value is incremented under a predetermined condition.

7. The method of claim 6, wherein the predetermined condition comprises a level of traffic congestion above a predetermined threshold.

8. The method of claim 1, further comprising: selecting and implementing, via the SDN controller, an event-based network operation profile.

9. The method of claim 8, wherein the selection of the event-based network operation profile is based on detection of a first predetermined non-temporal network activity event.

10. The method of claim 8, wherein the event-based network operation profile is implemented for a defined time period following a detection of a network activity event.

11. The method of claim 8, wherein the event-based network operation profile comprises incrementing the TTL value.

12. The method of claim 8, wherein the event-based network operation profile is defined in terms of a change to another network operation profile.

13. The method of claim 8, wherein the event-based network operation profile defines network behavior via a plurality of communication ports of each network switch.

14. A method of operating a software-defined network (SDN), comprising:
   defining, via a software-defined network controller (SDN controller), a first network flow to be implemented by a plurality of networking devices connected as part of the SDN;
   receiving a data packet via a network router of the SDN;
   setting a Time to Live (TTL) value of the data packet at a higher value in response to a detected level of traffic congestion that exceeds a congestion threshold; (from original dependent claims 8 and 9);
   sequentially transmitting the data packet to each of a plurality of network switches within the SDN;
   decrementing, by each network switch that sequentially receives the data packet, the TTL value;

comparing, by each network switch, the TTL value with a TTL threshold value and forwarding the data packet based on a non-match;

receiving the data packet at a subsequent network switch of the SDN;

matching, by the subsequent network switch, the decremented TTL value of the data packet to the TTL threshold value; and dropping the data packet based on the matched TTL value with the TTL threshold value.

15. The method of claim 14, further comprising receiving a precise time signal via a precision time input port, and modifying the first network flow based on the received precise time signal.

16. The method of claim 14, further comprising:

detecting a network event via an event detection port of one of the plurality of networking devices; and modifying the first network flow based on the detected network event.

17. The method of claim 14, wherein the setting the TTL value of the data packet is based on a destination of the data packet within the SDN.

18. The method of claim 14, further comprising: selecting and implementing, via the SDN controller, an event-based network operation profile.

19. The method of claim 18, wherein the selection of the event-based network operation profile is based on detection of a first predetermined non-temporal network activity event.

20. The method of claim 18, wherein the event-based network operation profile comprises incrementing the TTL value.

* * * * *